A. A. TAYLOR.
CAR STEP.
APPLICATION FILED JULY 19, 1910.

986,103.

Patented Mar. 7, 1911.

2 SHEETS—SHEET 1.

Witnesses

Inventor
Adrian A. Taylor
By A. A. Gourick Attorney

A. A. TAYLOR.
CAR STEP.
APPLICATION FILED JULY 19, 1910.

986,103.

Patented Mar. 7, 1911.
2 SHEETS—SHEET 2.

Witnesses
J. Milton Jester.
O. Randolph, Jr.

Inventor
Adrian A. Taylor
By H. A. Gourick
Attorney

UNITED STATES PATENT OFFICE.

ADRIAN A. TAYLOR, OF LINCOLN, NEBRASKA.

CAR-STEP.

986,103.

Specification of Letters Patent.

Patented Mar. 7, 1911.

Application filed July 19, 1910. Serial No. 572,687.

*To all whom it may concern:*

Be it known that I, ADRIAN A. TAYLOR, a citizen of the United States, residing at Lincoln, in the county of Lancaster and State of Nebraska, have invented certain new and useful Improvements in Car-Steps, of which the following is a specification.

My invention relates to car steps as used on railway passenger coaches and has for its object the provision of a folding step secured to the bottom of the steps as at present constructed, and which may be let down when the car is at rest to form an additional step for the use of passengers entering and leaving the car and dispense with the use of the stools usually employed to bridge the space between the lowermost permanent step and the station platform.

My invention also provides mechanism for operating the folding step by the opening and closing of the vestibule door of the car, so that when the door is closed against the ingress and egress of passengers the step is folded and when the door is opened the step is lowered into position for use.

My invention will be described in detail hereinafter and illustrated in the accompanying drawings in which—

Figure 2:
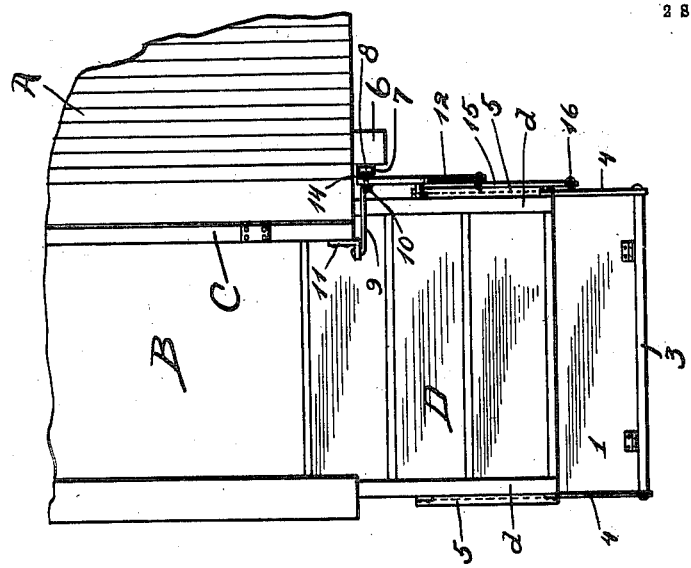
Figure 1:
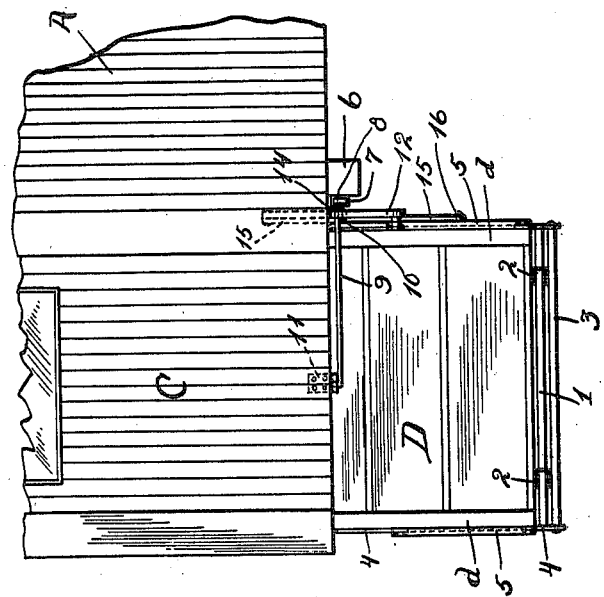
Figure 5:
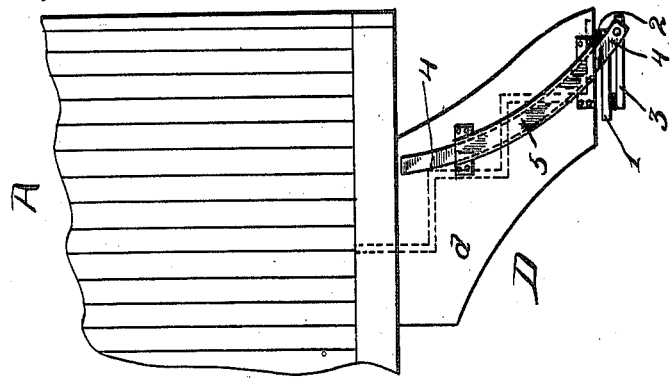
Figure 4:
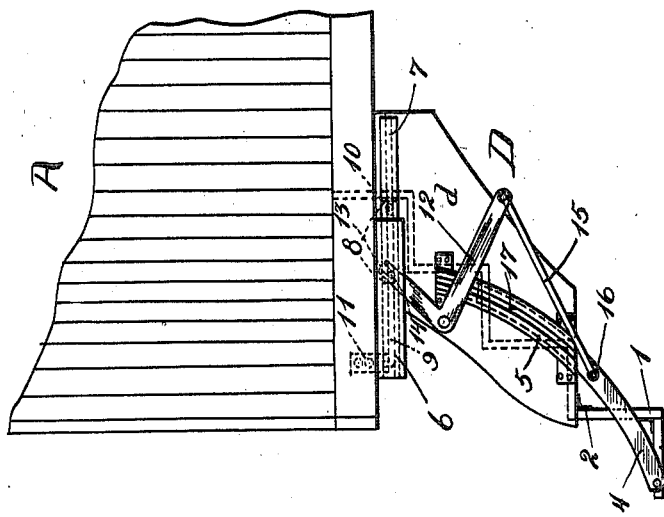
Figure 3:
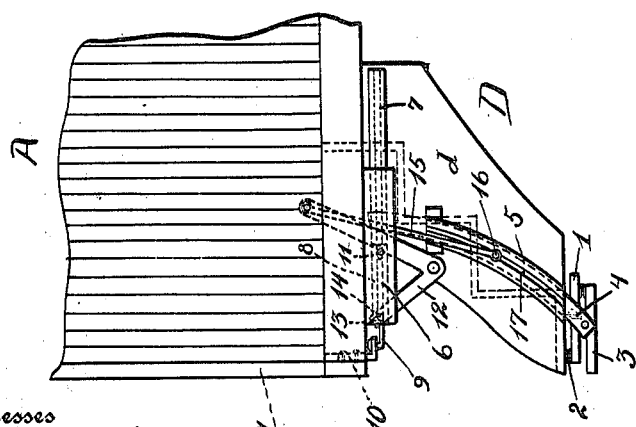

Figure 1, is a side view of a fragment of a vestibule car showing the steps and the vestibule door closed and the folding step folded, Fig. 2, a similar view showing the vestibule door open and the step lowered, Figs. 3 and 4, side views showing the vestibule door closed and open respectively, and Fig. 5, a view showing the opposite side of the steps from that shown in Figs. 3 and 4.

In the drawings similar reference characters indicate corresponding parts in all of the views.

A indicates a passenger coach having vestibule B, swinging door C and the permanent steps D.

Secured to the lower step of the permanent steps D is an extensible step consisting of a step riser 1 that is hinged to the step as shown at 2 and hinged to the free edge of the riser 1 is a tread 3, this structure forming an auxiliary or extensible step that when lowered bridges the space between the lowermost permanent step and the station platform or ground and which when not in use folds under the lowermost step out of the way of possible obstructions on the railroad right of way.

Secured to the ends of tread 3 are segmental bars 4, and 5 indicates segmental casings secured to the end-boards *d* of the steps D to receive said bars 4.

6 indicates a beam secured under the car on which is secured a grooved guide bar 7, having slidably mounted therein a block 8.

9 indicates a rod pivotally mounted in an eyeloop 10 secured to block 8 at one end, and its other end pivotally engaging a bracket 11 secured to the bottom of swinging door C, said rod 9 being of sufficient length that it is at an oblique angle to the door when closed so that block 8 is always pushed inwardly when the door C is opened.

12 indicates a bell crank lever fulcrumed on one of the end boards *d* and having its upper end slotted as shown at 13 to receive a pin 14 on block 8. The other end of lever 12 has a rod 15 secured thereto and engaging a pin 16 on segmental bar 4.

17 indicates a slot in casing 5 to receive pin 16 when the extensible step is folded.

From the above description and an inspection of the drawings it will be apparent that when the vestibule door C is closed as shown in Figs. 1 and 3 the rod 9 secured thereto draws the block 8 forwardly so that the lever 12 is swung into position to lift the step tread 3 and it is folded on riser 1. When the vestibule door is opened, as shown in Figs. 2 and 4, the block 8 is moved rearwardly swinging the lever 12 downwardly and the extensible step is lowered into position for use.

Having thus described my invention, what I claim is:

1. In combination with a car platform, a door to close the end of the platform, and fixed steps secured to said platform, a foldable step secured to the lowermost of said fixed steps, a bell-crank lever suitably fulcrumed and operatively secured to the foldable step, and means operatively connected with the door and secured to the bell-crank lever to swing it.

2. In combination with a car platform, a swinging door to close the end of the platform, and fixed steps secured to said platform, a foldable step secured to the lowermost of said fixed steps, segmental bars secured to said foldable step and slidably mounted on the fixed steps, a bell-crank lever suitably fulcrumed, a rod connecting one arm of the lever and one of said segmental bars, a block slidably mounted and operatively secured to the free arm of the lever, and a rod pivotally secured to the door aforesaid and to the block to move the block when the door is swung.

In witness whereof I hereto affix my signature in the presence of two witnesses.

ADRIAN A. TAYLOR.

Witnesses:
H. T. FOLSOM,
ED. J. ANDERSON.